Patented June 16, 1942

2,286,414

UNITED STATES PATENT OFFICE 2,286,414

TREATMENT OF ASPHALT

Arthur B. Hersberger, Lansdowne, Pa., assignor to The Atlantic Refining Company, Philadelphia, Pa., a corporation of Pennsylvania No Drawing. Application August 5, 1939, Serial No. 288,575

2 Claims. (Cl. 106—269)

The present invention relates to the treatment of bituminous substances such as asphalt, and relates more particularly to a method for reducing or eliminating the staining tendency of asphalts which may be employed in the manufacture of roofing materials, or as plying adhesives in the manufacture of waterproof wrapping papers, cartons, and the like.

In the production of roofing materials, for example, asphalt shingles surfaced with mineral particles such as limestone chips, it is necessary to employ as a waterproofing agent, and as binder or adhesive for the mineral particles imbedded in the surface of the shingle, asphalt characterized in having a high degree of plasticity and little or no tendency toward staining the mineral particles by sweating or exudation of oil components.

Similarly, in the production of waterproof wrapping paper, cartons, or the like, it is necessary to employ as the waterproofing or plying agent, asphalt having considerable adhesive power and relatively little or no tendency toward staining the articles subsequently to be wrapped or encased in the waterproof paper or carton.

It has been found that staining results from the sweating or exudation of oil from the asphalt, and is particularly noticeable in asphalts produced from Mid-Continent crude oils. In general, the higher the oil content of the asphalt, the lower the viscosity of such oil and the more paraffinic the oil, the greater will be the tendency of the asphalt to exude oil and cause staining. Reduction of the oil content of such asphalt by distillation to an extent sufficient to eliminate staining is not feasible, since the plasticity and other properties of the asphalt would be so altered as to render the product unmarketable.

I have found that asphalts which normally tend to stain, and which are therefore unsuitable for use in the manufacture of products in which staining must be avoided, may be reduced in staining tendency or rendered substantially non-staining by a simple and relatively inexpensive treatment. Such treatment comprises essentially the addition to the asphalt of a small quantity of a jelling agent to cause gelation of the oil content of the asphalt to an extent sufficient to prevent exudation or sweating of the oil therefrom under normal conditions of use. The jelling agent may be added in various percentages, depending upon the agent used and the characteristics of the asphalt to be treated. In general, the quantity of jelling agent to be employed is of the order of from about 0.1% to about 5% by weight of the asphalt. Quantities ranging from about 0.5% to about 2.5% are preferred. Among the jelling agents which may be utilized in accordance with my invention are the substantially water-insoluble soaps such as the stearates, palmitates, laurates, oleates and naphthenates of aluminum, calcium and strontium.

In carrying out my invention, a small quantity of a jelling agent, for example, aluminum stearate, may be added to the asphalt which has been melted or rendered fluid by heating, and the mixture agitated until the jelling agent has been homogeneously dispersed throughout the asphalt. The jelling agent may be added to the asphalt or asphalt stock before or during the processing of such asphalt to specification, or it may be added to the finished asphalt which has been processed to the desired specification. For example, the jelling agent may be added to a flux asphalt before or during the air blowing of same at elevated temperature (usually at 400° F.–550° F.) in the production of oxidized asphalt for the manufacture of roofing materials such as asphalt shingles. Or, alternatively, the jelling agent may be intimately admixed with the finished asphalt at the conclusion of the oxidation treatment.

My invention may be further illustrated by the following example, wherein the "Stain Number" was determined in accordance with the method published by Schweyer and Howell in Industrial & Engineering Chemistry, Analytical edition, vol. 9, No. 12, p. 563 et seq. (1937). "Stain Numbers" of a value below 3 are characteristic of asphalts considered suitable for use in the manufacture of products such as asphalt shingles, or saturants and adhesives for waterproof papers, cartons, and the like. Asphalts having "Stain Numbers" greater than 3 are generally considered as being unsuitable for such purposes.

A Mid-Continent crude oil was reduced by distillation to a crude residuum representing 15% of the initial oil. This residuum, having a specific gravity of 0.989 at 60° F. and a Saybolt Universal viscosity of 1160 seconds at 210° F., was subjected to treatment including oxidation, distillation of oil from the oxidized material, and blending of the resulting distillation residue or bottoms with a portion of the initial crude residuum to produce a flux asphalt having the following properties:

| | |
|---|---|
| Specific gravity (60° F.) | 1.0168 |
| Softening point (R. & B.) | 107° F.–109° F. |
| Penetration at 32° F. | 35 |
| Penetration at 77° F. | 160 |
| Ductility | 110+ |
| Viscosity (Furol at 250° F.) | 164" |
| Viscosity (Furol at 350° F.) | 27" |

To the above described flux asphalt was added 2.5% by weight of aluminum stearate and the mixture was agitated at about 300° F. until the stearate appeared to be uniformly dispersed or dissolved in the flux asphalt. This mixture was then air blown at a temperature of about 500° F. until an asphalt was produced having a softening point of about 208° F.–210° F. The resulting blown asphalt was found to have a "Stain Number" of 3, when tested in accordance with the method above referred to, whereas a blown asphalt of similar softening point prepared from the same flux, but containing no aluminum stearate, was found to have a "Stain Number" of 5.

While, in the above example, I have shown the use of a jelling agent such as aluminum stearate for reducing the staining tendency of asphalt, it will be understood that my invention is not limited thereto, since other agents, including the aluminum, calcium, and strontium soaps of various organic acids, or mixtures of two or more thereof, may be suitably employed.

What I claim is:

1. The method of producing an improved asphalt of reduced staining tendency from flux asphalt, which comprises adding to the flux asphalt a small but sufficient quantity of a substantially water-insoluble soap to cause gelation of the exudable oil content of said flux and subjecting the mixture to air blowing at elevated temperature.

2. The method of producing an improved asphalt of reduced staining tendency from flux asphalt, which comprises adding to the flux asphalt from about 0.1% to about 5% by weight of aluminum stearate and subjecting the mixture to air blowing at elevated temperature.

ARTHUR B. HERSBERGER.